Patented Apr. 8, 1924.

1,489,876

UNITED STATES PATENT OFFICE.

JAMES WHITTEMORE, OF DETROIT, MICHIGAN, ASSIGNOR TO THE LIBBEY-OWENS SHEET GLASS COMPANY, OF TOLEDO, OHIO, A CORPORATION OF OHIO.

DRAWING SHEET GLASS.

Application filed April 20, 1921. Serial No. 462,888.

*To all whom it may concern:*

Be it known that I, JAMES WHITTEMORE, a citizen of the United States, residing at Detroit, in the county of Wayne and State of Michigan, have invented new and useful Improvements in Drawing Sheet Glass, of which the following is a specification.

When a sheet of glass is drawn from a mass of molten glass, for some reason there are produced very shallow inequalities or waves on the surface, which are very undesirable. If these waves could be eliminated, a sheet could be drawn which would be quite similar, if not equal, to plate glass in clearness of vision.

It is my opinion that these waves are largely produced by variations in the surface tension at different points in the sheet width, and that these waves are due to the slightly different heat conditions in the glass at the base of the meniscus.

In order to more nearly equalize the heat throughout the width of the sheet and thus overcome some or all of these waves, I heat the glass along the lines of the base of the meniscus and thus equalize the surface tension at all points.

This adding of the heat to the surface may, in some cases, require that the middle or mass of glass which goes into the sheet, shall be slightly lowered in temperature, and, in such cases I employ a cooling bar beneath the middle of the meniscus.

In the use of the surface heater and the core cooler for the sheet in addition to equalizing the surface tension at all points, the temperature of the sheet throughout is more nearly uniform and a large part of the internal strains are eliminated; and further, the mass being of more nearly uniform temperature, in cooling a flatter and more perfect sheet will be produced.

In the drawings—

Figure 1:
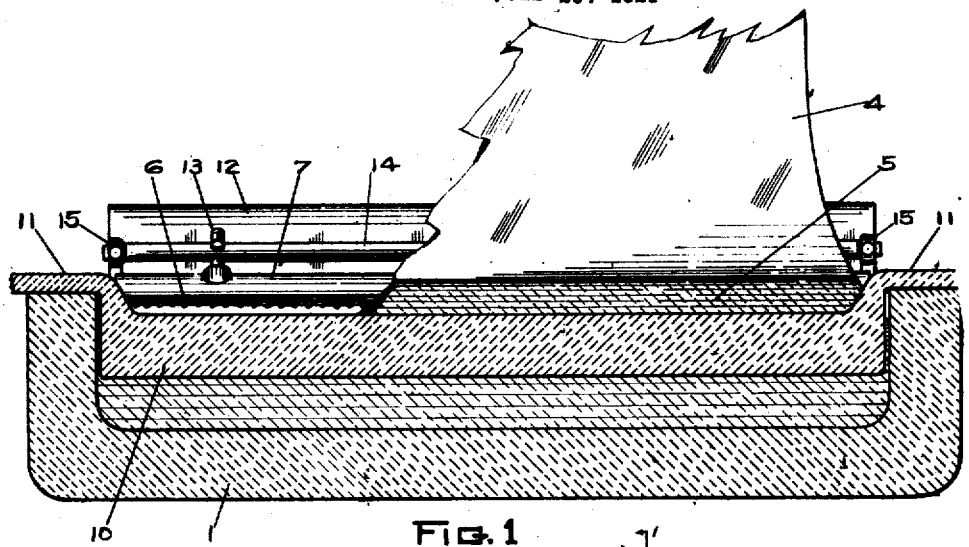
Figure 1 is a transverse vertical section through the drawing pot of one form of my apparatus, the view being taken substantially on line 1—1 of Fig. 2, part of the sheet being broken away to disclose the heater.

In the drawings I have shown my invention in connection with an apparatus of the well known Colburn type now in use.

The shallow draw pot or receptacle 1 is continually supplied with molten glass from a suitable source such as a continuous tank furnace. The sheet of glass 4 is drawn up from the glass in the pot by suitable drawing means, not shown, 5 is the so-called meniscus at the point where the sheet is drawn from the mass.

Figure 2:
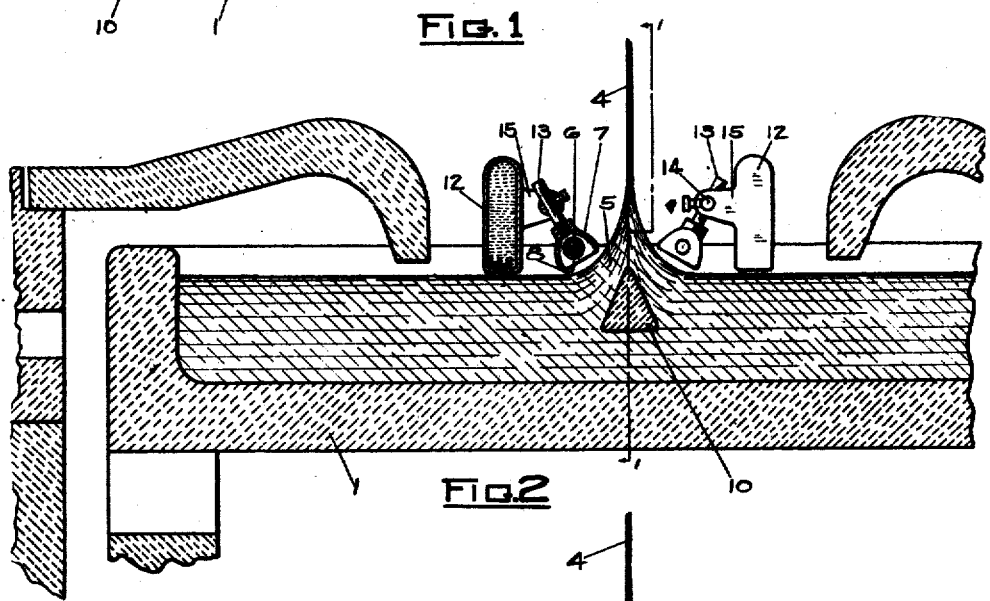
Figure 2 is a vertical central section through Fig. 1.

At each side of the sheet and at the base of the meniscus where the surface tension is greatest, I apply heat. As shown in Figs. 1 and 2, this may be an electric heater 6, enclosed in an insulating covering 7, with an opening for the more effective discharge of the heat at the bottom as indicated at 8, this slot being at the base of the meniscus.

Figure 3:
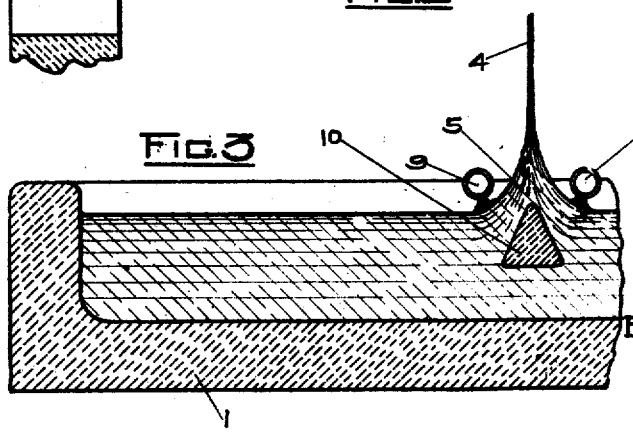
Figure 3 is a similar section of a modification.

Instead of an electric heater, I may employ any other means of heating, such as a slotted gas pipe burner 9, shown in Fig. 3 and in such case I prefer to have the flames jetted downward against the travel of the sheet, so, as far as possible, to localize the heat at the base of the meniscus.

These heaters may be raised and lowered to and from the surface to regulate the degree of heat added. But all that is required is to slightly soften the surface of the glass so as to equalize the temperature of the surface at the base of the meniscus, for the purpose of equalizing the surface tension all along the width of the sheet.

In the example shown in Figs. 1 and 2 of the drawings, the heaters 7 are supported adjustably from the coolers 12, by means of stems 13, longitudinally adjustable through supporting rod 14, which in turn is adjustably carried by ears 15 projecting from the sheet-side of the coolers.

In cases where it is desirable to cool the glass going to the interior mass of the sheet, I apply a cooling bar 10, of refractory material, carried by supporting bars 11, which may rest upon the sides of the pot, and which may be adjusted up or down so the bar 10 may be raised or lowered.

In operation, the sheet being started, as usual, the heaters, either electrical or gas, are placed as shown and described, and slightly raising the temperature of the surface of the glass at the drawing point, will equalize the surface tension and eliminate some or all of the waves produced by the unequal surface tension.

When the cooling bar is used, it will be placed in position as shown, and will slightly lower the temperature of the interior mass while the exterior is raised in temperature by the heaters, with the advantageous results heretofore pointed out.

What I claim as my invention is:

1. In a sheet glass drawing apparatus, a receptacle containing molten glass from which a sheet of glass is drawn, means within the molten glass in the receptacle for cooling the glass drawn into the interior of the sheet, and heaters adjacent the sheet source for heating the glass drawn into the surface portions of the sheet.

2. The process of drawing sheet glass from a molten mass of glass, consisting in cooling from within the molten mass the glass which is being drawn into the interior of the sheet, and simultaneously heating the surface portions of the mass at the sheet source.

3. In a sheet glass drawing apparatus, a receptacle containing molten glass, means for drawing a sheet therefrom, and electric heaters extending across each face of the sheet near the source.

4. The process of drawing sheet glass from a molten mass, which consists in cooling the molten glass which is drawn into the interior of the sheet and heating the surface portions of the sheet at their origin.

5. In a sheet glass drawing apparatus, a receptacle containing molten glass, means for drawing a sheet of glass therefrom, a cooling bar submerged within the molten glass beneath the line of the draw of the sheet, and heaters extending across each face of the sheet, near the molten mass.

6. In a sheet glass drawing apparatus, a receptacle containing molten glass, means for drawing a sheet therefrom, a cooling bar submerged in the glass beneath the meniscus, and electric heaters extending across each face of the sheet near the base of the meniscus.

Signed at Santa Barbara, in the county of Santa Barbara and State of California, this 8th day of March, 1921.

JAMES WHITTEMORE.